(12) United States Patent
Straub

(10) Patent No.: US 6,766,654 B2
(45) Date of Patent: Jul. 27, 2004

(54) AIR CONDITIONING SYSTEM FOR A MOTOR VEHICLE

(75) Inventor: Wolfgang Straub, Deggingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/394,121

(22) Filed: Mar. 21, 2003

(65) Prior Publication Data

US 2004/0003602 A1 Jan. 8, 2004

(30) Foreign Application Priority Data

Mar. 23, 2002 (DE) .......................................... 102 13 154

(51) Int. Cl.⁷ ................................................. B60H 1/32
(52) U.S. Cl. ............................. 62/244; 26/285; 26/288; 26/291
(58) Field of Search ......................... 62/285, 288, 291, 62/91, 176.1, 176.4, 190

(56) References Cited

U.S. PATENT DOCUMENTS

| 5,293,928 | A | * | 3/1994 | Iida et al. .................... 165/204 |
| 5,775,415 | A | * | 7/1998 | Yoshimi et al. ............. 165/202 |
| 6,123,267 | A | * | 9/2000 | Baker et al. ........... 237/12.3 R |
| 6,129,140 | A | * | 10/2000 | Kawahara .................... 165/42 |
| 6,213,198 | B1 | * | 4/2001 | Shikata et al. .............. 165/202 |
| 6,263,685 | B1 | * | 7/2001 | Strobel ......................... 62/133 |
| 6,311,763 | B1 | * | 11/2001 | Uemura et al. ............... 165/43 |
| 6,595,276 | B2 | * | 7/2003 | Bendell et al. ............. 165/202 |

FOREIGN PATENT DOCUMENTS

| DE | 3223812 A1 | * 12/1983 |
| DE | 197 31 369 | 7/1998 |
| DE | 198 50 914 | 5/2000 |
| JP | 360001023 A | * 1/1985 |
| JP | 406229639 A | * 8/1994 |

* cited by examiner

Primary Examiner—William E. Tapolcai
Assistant Examiner—Mohammad M. Ali
(74) Attorney, Agent, or Firm—Kenyon & Kenyon

(57) ABSTRACT

An air conditioning system for a motor vehicle includes an air conditioning box through which blower air can flow and in which an evaporator and, at a distance therefrom, a heat exchanger are arranged, and including an air distributor which has air outlet openings which may be controlled by air control elements, and a water outlet arranged between the evaporator and heat exchanger, and having a control arrangement for forcibly ejecting the blower air emerging at the evaporator via the water outlet into the vehicle environment. For the purpose of forcibly ejecting the loaded blower air in a cost-effective and construction-space-saving manner without losses in efficiency, the control arrangement may be formed in the air outlet openings by the air control elements which, during the ejection, are forcibly closed.

20 Claims, 1 Drawing Sheet

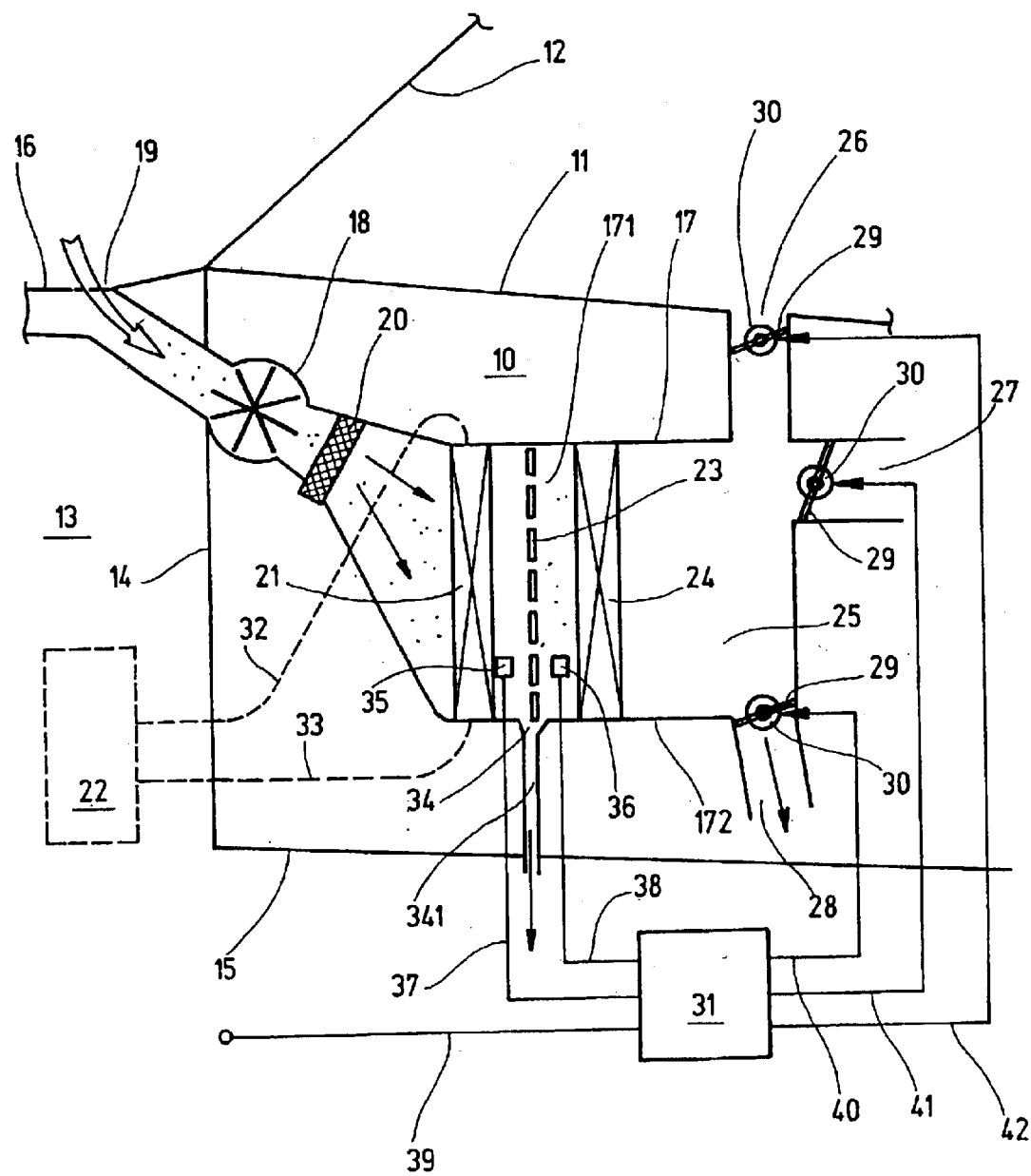

AIR CONDITIONING SYSTEM FOR A MOTOR VEHICLE

CROSS-REFERENCE TO RELATED APPLICATIONS

The present application claims priority to Application No. 102 13 154.6, filed in the Federal Republic of Germany on Mar. 23, 2002, which is expressly incorporated herein in its entirety by reference thereto.

FIELD OF THE INVENTION

The invention relates to an air conditioning system for a motor vehicle.

BACKGROUND INFORMATION

In the case of vehicles having an air conditioning system, there is the problem that when the air conditioning system is re-started after a short standing time the windows become misted up under certain environmental conditions. This is because after the air conditioning system is switched off, the surface of the evaporator is moist, and the warm environment in the engine compartment or in the environment causes the temperature of the air in the air conditioning box to rise. This increases the humidity of the air flowing into the vehicle interior where it brushes past the vehicle windows, in particular past the windscreen or front window. The same problem occurs in the case of vehicles having air conditioning systems which make use of the residual heat from the engine and/or have auxiliary heating. In moist, cool weather the windows become misted up because humidity has collected in the air conditioning box during the previous driving operation due to the air which has been taken into the cab being dried in the reheating mode, and the humidity is blown together with the air into the vehicle interior.

In the case of a conventional air conditioning system of the type mentioned at the beginning (German Published Patent Application No. 197 31 369), this increased tendency of the windows to become misted up is counteracted by the evaporator being bridged by a bypass, the bypass opening of which, which is situated upstream of the evaporator in the air flow direction, can be closed or opened by a controllable shut-off element. In addition, a second shut-off element is arranged in the air conditioning box between the evaporator and the heat exchanger, which shut-off element is able to shut off the entire flow cross-section between the evaporator and the heat exchanger. This second shut-off element is arranged downstream, as seen in the air flow direction, of the water outlet formed in the air conditioning box. The surface humidity of the evaporator is detected by a humidity or moisture sensor and if it exceeds a limit value a control unit is used to transfer the first shut-off element into its open position and the second shut-off element into its closed position, as a result of which a first partial air flow flows around the evaporator and a second air flow, which passes through the moist evaporator, flows off via the water outlet, which is formed in the air conditioning box, into the vehicle environment. While the vehicle interior continues to be supplied with heated or unheated air via the first partial air flow, the second partial air flow causes the evaporator to be dried. After this drying process, the two shut-off elements are changed over again, so that now all the air conveyed by the blower flows again through the evaporator.

In the case of air conditioning systems for motor vehicles, the evaporator, which is integrated in the air conditioning box, is connected into the refrigerant circuit of a cooling unit. If there are leakages in the refrigerant circuit, the refrigerant may be emitted. If these leakages occur within the air conditioning box, the quantities of toxic refrigerant which have been leaked are blown together with the blower air into the vehicle interior and lead in the long term to damage to the vehicle occupants' health. In the case of a conventional air conditioning system (German Published Patent Application No. 198 50 914), in which $CO_2$ is used as refrigerant, in order to avoid health-damaging $CO_2$ concentrations in the blower air blown into the interior in the event of leakages at the evaporator, a $CO_2$ sensor has been arranged behind the heat exchanger and one or more air flaps interrupting the supply of air from the ventilation system into the interior of the motor vehicle have been provided behind the heat exchanger, in the flow direction, in the ventilation system, the air flaps being controlled by a control unit as a function of the input signal of the $CO_2$ sensor. If the $CO_2$ sensor detects a $CO_2$ concentration in the blower air emerging from the evaporator, the control unit transfers the air flaps into their closed position, as a result of which all of the blower air is blown to the outside via an overpressure outlet arranged between the evaporator and heat exchanger in the air conditioning box.

It is an object of the present invention to provide, in the case of an air conditioning system of the type mentioned above, the forced ejection of loaded blower air in a cost-effective and construction-space-saving manner with the same efficiency.

SUMMARY

The above and other beneficial objects of the present invention may be achieved by providing an air conditioning system as described herein.

An air conditioning system according to an example embodiment of the present invention may provide that, by using the air control elements which are present in any case at the air outflow openings, which are connected to the vehicle interior, in order to eject the blower air via the water outlet, no further constructional elements may be required for the ejection, so that there may be neither an additional need for construction space in order to accommodate such constructional elements nor may costs arise for the production thereof. The ejection function may be implemented cost-effectively in the control unit for actuating the air control elements, which unit is present in any case in automatic air conditioning system.

Example embodiments of the air conditioning system according to the present invention together with further aspects, developments and refinements of the present invention are described below.

The present invention is described in greater detail below with reference to an exemplary embodiment illustrated in the drawing. The drawing illustrates a schematic illustration of a longitudinal section of an air conditioning system of a motor vehicle.

BRIEF DESCRIPTION OF THE DRAWING

FIG. 1 is a schematic, longitudinal cross-sectional view of an example embodiment of an air conditioning system of a motor vehicle according to the present invention.

DETAILED DESCRIPTION

The air conditioning system, which is only illustrated schematically and in longitudinal section in FIG. 1, for the interior 10 of a motor vehicle has an air conditioning box 17 which is installed in the interior 10 below a dashboard 11. The drawing also illustrates a windscreen or front window 12, an end wall 14 separating the interior 10 from an engine compartment 13 mounted in front of it, and a body floor 15 delimiting the interior 10 downwardly. An inlet of the air conditioning box 17, which inlet protrudes to the end wall 14, is connected to the outlet of a blower 18. The blower inlet is connected to a fresh air opening 19 in an engine bonnet 16 covering the engine compartment 13. A dust filter 20 is arranged downstream of the blower outlet. When the blower 18 is switched on, the blower 18 takes in air from the vehicle environment via the fresh air opening 19 and blows this air via the dust filter 20 into the air flow path formed by the air conditioning box 17. In the air conditioning box 17, the fresh air which has been taken in is conditioned and blown out via air outlet openings of the air conditioning box 17 into the interior 10.

Arranged in the air conditioning box 17, one behind another, as seen in the flow direction of the blower air, is an evaporator 21 of an air conditioning unit 22, a water separator 23 in the form of a drip membrane, a heat exchanger 24 through which the cooling water of the internal combustion engine of the motor vehicle flows, and an air distributor 25 which has a plurality of air outlet openings for ventilating the vehicle interior 10. There is also a defroster opening 26 via which air is blown onto the front window 12 extending above the dashboard 11, a central opening 27 which is connected to central and side nozzles for ventilating the central region of the interior 10, and a footwell opening 28 which is connected to footwell nozzles arranged in the left and right side of the interior 10, for ventilating the footwell on the driver's side and front passenger's side. Each of the air outlet openings 26–28 may be controlled with regard to the opening cross-section opened up by them by an air control element 29 in the form of pivotable air flaps. Each air control element 29 is actuated by an adjusting element 30 which may be arranged, for example, as an electric servomotor. The adjusting elements 30 are activated by an electronic control unit 31 which supplies adjusting signals, which correspond to the air conditioning conditions and are intended for setting the air control elements 29, to the adjusting elements 30 via control lines 40–41. The evaporator 21, through which a refrigerant flows, is connected into the refrigerant circuit of the cooling unit 22 and, for this purpose, is connected to the cooling unit 22 via lines 32, 33. Further cooling-unit components are arranged in the refrigerant circuit, such as the compressor, expansion valve, etc.

In that sector 171 in the air conditioning box 17 which is bounded by the evaporator 21, on the one side, and by the heat exchanger 24, on the other side, a water outlet 34 is formed at the bottom in the base 172 of the air conditioning box 17, the water outlet opening freely via an outlet pipe or outlet hose 341 outside the interior 10, in this case below the vehicle floor 15. The water outlet 34 serves for conducting away water which drips from the water separator 23 as a consequence of the air humidity from the blower air, which flows through the water separator 23 and is laden with moisture, precipitating at the water separator 23. Arranged in the sector 171 is a humidity detector 35 and a gas detector 36, the electric output signals of which are supplied to the control unit 31 via signal lines 37, 38. The humidity detector 35 is used to detect the air moisture on the surface of the evaporator 21, and the gas detector 36 is used to trace the concentrations contained in the blower air of refrigerant emissions caused by leakages in the refrigerant circuit. The output signals of the two detectors 35, 36 are converted in the control unit 31 by an evaluating logic into adjusting signals for the adjusting elements 30 on the air control elements 29.

The air conditioning system which has been described operates as follows:

In normal operation, the air control elements 29 are set in the air outlet openings 26–28 such that a certain amount of the air which has been conditioned in accordance with the desired air conditioning is blown into the interior 10 via the various air outlet openings 26–28. If the moisture measured by the moisture detector 35 and/or the gas concentration measured by the gas detector 36 exceed/exceeds the maximum permitted value, then a control signal is generated in the control unit 31, the signal being supplied via the control lines 40–42 to each of the adjusting elements 30 and leading, by the adjusting elements 30, to the air outlet openings 26–28 being completely closed by the air control elements 29. When the blower 18 is switched on, the blower air flowing through the evaporator 21 is forcibly conducted away into the environment of the motor vehicle via the water outlet 34. If the values measured by the detectors 35, 36 drop below the prescribed values, then the closing signals of the control unit 31 cease, and the air control elements 29 are returned again into the previously assumed position.

In the case of air conditioning systems which utilize residual heat from the engine or have auxiliary heating, there may be the problem that in moist, cool weather the windows may become misted up on starting of the internal combustion engine of the motor vehicle and with the associated switching on of the air conditioning system because moisture has accumulated in the air conditioning box 17 during the previous driving operation due to the air taken into the interior being dried in the reheating mode and this moist air then being blown into the interior 10. As an alternative or in addition, this moist air may also be eliminated by a starting signal being supplied to the control unit 31 via a signal line 39 on starting the internal combustion engine. The control unit 31 transfers the air control elements 29 into their closed position in the same is manner as described and maintains this closed position for a predetermined period. In this period, the air conditioning box 17 is dried by the blower air being forcibly ejected via the water outlet 34, so that after the period has expired and the control signals to the air control elements 29 have ceased, sufficiently dry blower air flows into the interior 10.

What is claimed is:

1. An air conditioning system for a motor vehicle, comprising:
   an air conditioning box through which blower air is flowable;
   an evaporator arranged in a refrigerant circuit and arranged in the air conditioning box;
   a heat exchanger arranged in the air conditioning box at a distance from the evaporator;
   an air distributor arranged downstream of the heat exchanger and including air outlet openings;
   a water outlet arranged between the evaporator and the heat exchanger; and
   a control arrangement configured to forcibly eject blower air emerging at the evaporator via the water outlet into a vehicle environment, the control arrangement including air control elements configured to control the air outlet openings, the control arrangement configured to forcibly close the air control elements for ejection.

2. The air conditioning system according to claim 1, further comprising adjustment elements configured to act on the air control elements to adjust the air control elements, the adjustment elements connected to a control unit configured to activate the adjustment elements when a criterion requiring a forced ejection occurs to initiate an adjusting process to close the air control elements.

3. The air conditioning system according to claim 2, wherein the criterion is derived from a start-up of the motor vehicle.

4. The air conditioning system according to claim 3, further comprising an arrangement configured to initiate forced ejection with the start-up of the motor vehicle and to end the forced venting after a fixed period of time.

5. The air conditioning system according to claim 2, wherein the criterion is derived from air moisture at the evaporator.

6. The air conditioning system according to claim 2, wherein the criterion is derived from a concentration of refrigerant in the blower air, the refrigerant emitted from the refrigerant circuit of the evaporator.

7. The air conditioning system according to claim 5, wherein the control unit is connected on an input side to at least one of a moisture and a gas detector arranged in the air conditioning box.

8. The air conditioning system according to claim 6, wherein the control unit is connected on an input side to at least one of a moisture and a gas detector arranged in the air conditioning box.

9. The air conditioning system according to claim 7, wherein the detector is arranged in the air conditioning box in a sector of the air conditioning box bounded by the evaporator and the heat exchanger.

10. The air conditioning system according to claim 8, wherein the detector is arranged in the air conditioning box in a sector of the air conditioning box bounded by the evaporator and the heat exchanger.

11. An air conditioning system for a motor vehicle, comprising:

an air conditioning box through which blower air is flowable;

an evaporator arranged in a refrigerant circuit and arranged in the air conditioning box;

a heat exchanger arranged in the air conditioning box at a distance from the evaporator;

an air distributor arranged downstream of the heat exchanger and including air outlet openings;

a water outlet arranged between the evaporator and the heat exchanger; and control means for forcibly ejecting blower air emerging at the evaporator via the water outlet into a vehicle environment, the control means including air control elements for controlling the air outlet openings, the control means forcibly closing the air control elements for ejection.

12. The air conditioning system according to claim 11, further comprising adjusting elements for acting on the air control elements for adjusting the air control elements, the adjusting elements connected to a control unit for activating the adjusting elements when a criterion requiring a forced ejection occurs to initiate an adjusting process to close the air control elements.

13. The air conditioning system according to claim 12, wherein the criterion is derived from a start-up of the motor vehicle.

14. The air conditioning system according to claim 13, further comprising means for initiating forced ejection with the start-up of the motor vehicle and for ending the forced venting after a fixed period of time.

15. The air conditioning system according to claim 12, wherein the criterion is derived from air moisture at the evaporator.

16. The air conditioning system according to claim 12, wherein the criterion is derived from a concentration of refrigerant in the blower air, the refrigerant emitted from the refrigerant circuit of the evaporator.

17. The air conditioning system according to claim 15, wherein the control unit is connected on an input side to at least one of a moisture and a gas detector arranged in the air conditioning box.

18. The air conditioning system according to claim 16, wherein the control unit is connected on an input side to at least one of a moisture and a gas detecting means arranged in the air conditioning box.

19. The air conditioning system according to claim 17, wherein the detecting means is arranged in the air conditioning box in a sector of the air conditioning box bounded by the evaporator and the heat exchanger.

20. The air conditioning system according to claim 18, wherein the detecting means is arranged in the air conditioning box in a sector of the air conditioning box bounded by the evaporator and the heat exchanger.

* * * * *